US009266269B2

(12) United States Patent
Yamaguchi

(10) Patent No.: US 9,266,269 B2
(45) Date of Patent: Feb. 23, 2016

(54) INJECTION APPARATUS

(75) Inventor: Kazuyuki Yamaguchi, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 38 days.

(21) Appl. No.: 14/125,617

(22) PCT Filed: Jun. 25, 2012

(86) PCT No.: PCT/JP2012/066156
§ 371 (c)(1),
(2), (4) Date: Dec. 12, 2013

(87) PCT Pub. No.: WO2013/005597
PCT Pub. Date: Jan. 10, 2013

(65) Prior Publication Data
US 2014/0130912 A1 May 15, 2014

(30) Foreign Application Priority Data

Jul. 6, 2011 (JP) ................................. 2011-150262

(51) Int. Cl.
*B22D 17/32* (2006.01)
*B29C 45/18* (2006.01)
(Continued)

(52) U.S. Cl.
CPC ............... *B29C 45/18* (2013.01); *B22D 17/32* (2013.01); *B29C 45/531* (2013.01); *B29C 45/82* (2013.01); *Y10T 137/86035* (2015.04)

(58) Field of Classification Search
CPC ...... B22D 17/32; B29C 45/18; B29C 45/531; B29C 45/82
USPC ................................................ 164/312, 113
See application file for complete search history.

(56) References Cited

U.S. PATENT DOCUMENTS 4,023,466 A * 5/1977 Strassheimer ...................... 91/6
4,044,653 A * 8/1977 Aoki ............................. 91/392
(Continued)

FOREIGN PATENT DOCUMENTS

CN 1191784 9/1998
CN 2313734 4/1999
(Continued)

OTHER PUBLICATIONS

Japanese Office action dated Aug. 26, 2014.
(Continued)

*Primary Examiner* — Kevin P Kerns
(74) *Attorney, Agent, or Firm* — Greenblum & Bernstein, P.L.C.

(57) ABSTRACT

The injection apparatus, which injects a molding material into a mold by operating an injection cylinder and fills the mold with the molding material, includes a plurality of actuating mechanisms that is connected to the injection cylinder. Each actuating mechanism includes an actuating cylinder that supplies an incompressible fluid to the injection cylinder, and a drive part that drives a piston of the actuating cylinder. In a low-speed step and a high-speed step for injecting the molding material, the piston of each actuating cylinder is driven forward, and hydraulic oil is supplied to the injection cylinder. In a pressure-increasing step, the pistons of the actuating cylinders are driven forward, and hydraulic oil is supplied to the injection cylinder. As the injection apparatus includes a plurality of actuating mechanisms, the speed and pressure of the injection cylinder can be increased without requiring high performance from the drive parts.

8 Claims, 3 Drawing Sheets

(51) Int. Cl.
    *B29C 45/82*    (2006.01)
    *B29C 45/53*    (2006.01)

(56) References Cited

U.S. PATENT DOCUMENTS

| | | | | |
|---|---|---|---|---|
| 5,971,057 | A | * | 10/1999 | Yukisawa et al. ............ 164/113 |
| 2005/0226954 | A1 | | 10/2005 | Kayano et al. |
| 2009/0242161 | A1 | | 10/2009 | Uchida et al. |
| 2010/0000699 | A1 | * | 1/2010 | Uchida et al. ................ 164/113 |

FOREIGN PATENT DOCUMENTS

| | | |
|---|---|---|
| EP | 2730351 | 5/2014 |
| EP | 2769821 | 8/2014 |
| JP | 59-033130 | 2/1984 |
| JP | 2-142664 | 5/1990 |
| JP | 03-013257 | 1/1991 |
| JP | 06-134829 | 5/1994 |
| JP | 10-166407 | 6/1998 |
| JP | 11-010309 | 1/1999 |
| JP | 11-151740 | 6/1999 |
| JP | 2001-193706 | 7/2001 |
| JP | 2004-042648 | 2/2004 |
| JP | 2004-074533 | 3/2004 |
| JP | 2004-276092 | 10/2004 |
| JP | 2008-038961 | 2/2008 |
| JP | 2009-061458 | 3/2009 |
| JP | 2010-115683 | 5/2010 |
| WO | 2004/016373 | 2/2004 |
| WO | 2008/035805 | 3/2008 |

OTHER PUBLICATIONS

U.S. Appl. No. 14/125,647 to Kazuyuki Yamaguchi, which was filed Dec. 12, 2013.
International Preliminary Report on Patentability for PCT/JP2012/066156 (English-language translation).
Extended European Search Report for EP12806979.6 dated Feb. 12, 2015.
Chinese Official Action for CN201280031404.6 dated Feb. 28, 2015.
Chinese Office Action for counterpart Chinese Application No. CN201280031404.6, dated Oct. 10, 2015.

* cited by examiner

INJECTION APPARATUS

FIELD OF THE INVENTION

The present invention relates to an injection apparatus which injects a molding material into a mold and fills the mold with the molding material.

BACKGROUND OF THE INVENTION

Injection apparatuses are known as apparatuses for molding a desired product by injecting a molding material into a mold and filling the mold with the molding material. In recent injection apparatuses, for example, operating force is imparted to an injection cylinder using an electric motor as in the injection apparatus described in Patent Document 1. The injection apparatus described in this publication includes an injection cylinder device which operates an injection plunger for injecting a molding material into a mold and a conversion cylinder device which supplies hydraulic oil to the injection cylinder device. In the injection apparatus, an electric motor is used as a drive source for a conversion piston of the conversion cylinder device when supplying the hydraulic oil to the injection cylinder device. Due to this, the conversion piston of the conversion cylinder device operates with the driving force of the electric motor to supply hydraulic oil to the injection cylinder device. Due to this, the injection piston of the injection cylinder device operates toward the injecting direction of the molding material with the hydraulic oil supplied.

PRIOR ART DOCUMENT

Patent Document

Patent Document 1: Japanese Laid-Open Patent Publication No. 2010-115683

SUMMARY OF THE INVENTION

The injection apparatus generally operates in three steps: a low-speed step, a high-speed step and a pressure-increasing step; operates an injection piston in the respective steps at a desired speed; and also operates to impart a desired pressure to the molding material within a cavity. Thus, the injection apparatus described in the above publication, in which the actuating cylinder is operated with the driving force of the electric motor, allows the operating amount of the injection cylinder to be controlled more finely compared with the case where an actuating cylinder is operated only by the flow rate control of the hydraulic oil by means of a hydraulic pump. That is, a drive part having performance which can cover the above three steps would be required if a single drive part is controlled to carry out the above different steps. However, no such a drive part exists in current general-purpose machines.

An object of the present invention is to provide an injection apparatus which can realize high injection speed and injection pressure that cannot be realized with a single drive part.

In order to solve the above problem, one aspect of the present invention provides an injection apparatus which injects a molding material into a mold by operating an injection cylinder, and fills the mold with the molding material. The injection apparatus includes a plurality of actuating mechanisms connected to the injection cylinder. The respective actuating mechanisms include an actuating cylinder which supplies an incompressible fluid to the injection cylinder and a drive part which drives a piston of the actuating cylinder.

DETAILED DESCRIPTION OF THE PREFERRED EMBODIMENTS

Hereinafter, an injection apparatus according to one embodiment of the present invention will be explained in accordance with FIGS. 1 to 4.

Figure 1:
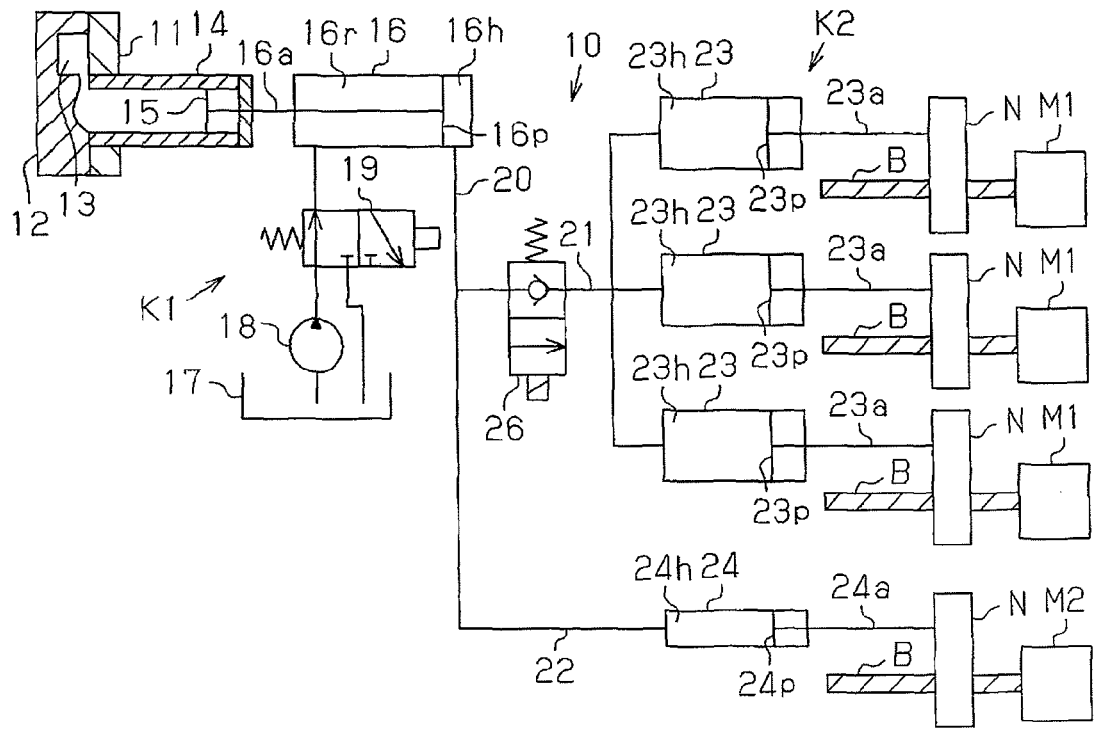
FIG. 1 is a schematic view showing an injection apparatus according to one embodiment of the present invention.

A die cast machine 10 as the injection apparatus shown in FIG. 1 is an apparatus which injects a metal material, for example, aluminum as a molten molding material into a cavity 13 formed by a fix mold 11 and a movable mold 12 which constitute a mold, and fills the cavity 13 with the metal material. The molding material injected into the mold is taken out after solidification, thereby forming a desired molded article. In the meantime, the fix mold 11 and the movable mold 12 are subjected to mold opening/closing and mold clamping by use of a mold clamping device not shown.

The metal material is supplied into an injection sleeve 14 which is in communication with the cavity 13. An injection plunger 15 which forces out the metal material supplied into the injection sleeve 14 into the cavity 13 is housed in the injection sleeve 14. The die cast machine 10 includes an injection cylinder 16 which drives the injection plunger 15. The injection plunger 15 is coupled to a piston rod 16a of the injection cylinder 16. A supplying/discharging mechanism K1 is connected to a rod side chamber 16r of the injection cylinder 16. The supplying/discharging mechanism K1 supplies hydraulic oil as an incompressible fluid to the rod side chamber 16r and discharges the hydraulic oil in the rod side chamber 16r. The supplying/discharging mechanism K1 includes an oil tank 17, a pump 18 which pumps up the hydraulic oil within the oil tank 17, and an electromagnetic switch valve 19 which selectively switches between the state where the pumped-up hydraulic oil can be supplied to the rod side chamber 16r and the state where the hydraulic oil within the rod side chamber 16r can be discharged into the oil tank 17. A supplying/discharging mechanism K2 is connected to a head side chamber 16h of the injection cylinder 16. The supplying/discharging mechanism K2 supplies hydraulic oil to the head side chamber 16h and discharges the hydraulic oil within the head side chamber 16h.

Hereinafter, the supplying/discharging mechanism K2 of this embodiment will be explained in detail.

A main line 20, which serves as a supply route and a discharge route for hydraulic oil, is connected to the head side chamber 16h of the injection cylinder 16. A plurality of sub lines 21, 22, which serve as supply routes and discharge routes for hydraulic oil, are connected to the main line 20. A plurality (three in this embodiment) of actuating cylinders 23 which supplies hydraulic oil to the injection cylinder 16 is connected to the sub line 21. Head side chambers 23h of the respective actuating cylinders 23 are connected to the sub line 21. Piston rods 23a of the respective actuating cylinders 23 are coupled to a nut N. The nut N is screwed with a ball screw B to be rotated by a servo motor M1 as an electric motor.

Also, an electromagnetic switching valve 26 is arranged in the sub line 21 to be positioned between the main line 20 and the three actuating cylinders 23. The electromagnetic switching valve 26 is selectively switched between the state where it allows for the flow of hydraulic oil from the main line 20 to the sub line 21 and the state where it allows for the flow thereof from the sub line 21 to the main line 20. The electromagnetic switching valve 26, when selectively switched into the state where it allow for the flow of hydraulic oil from the sub line 21 to the main line 20 (the state shown in FIG. 1), functions as a check valve which prevents hydraulic oil from flowing from the main line 20 to the sub line 21.

One actuating cylinder 24 which supplies hydraulic oil to the injection cylinder 16 is connected to the sub line 22. A head side chamber 24h of the actuating cylinder 24 is connected to the sub line 22. A piston rod 24a of the actuating cylinder 24 is coupled to a nut N. The nut N is screwed with a ball screw B to be rotated by a servo motor M2 as an electric motor.

The diameter of the respective actuating cylinders 23 connected to the sub line 21 is set to be identical with one another. The diameter of the actuating cylinders 24 is set to be smaller than that of the respective actuating cylinders 23. That is, the actuating cylinders 23, 24 have two types of cylinder diameters. The injection cylinder 16 in the die cast machine 10 of this embodiment operates by the hydraulic oil within the head side chambers 23h and 24h of the respective actuating cylinders 23 and 24 being supplied to the head side chamber 16h of the injection cylinder 16. Therefore, conditions including the numbers, diameters and step lengths of the actuating cylinders 23, 24 are set such that the injection cylinder 16 operates in a desired operating pattern (injection speed and injection pressure). In the meantime, the injection cylinder 16 is set to have a size with a volume which enables the inflow of the hydraulic oil from the actuating cylinders 23, 24.

Also, the die cast machine 10 of this embodiment is such that a plurality (four in this embodiment) of actuating mechanisms is connected to the injection cylinder 16. The respective actuating mechanisms include one actuating cylinder 23, 24 and corresponding one servo motor M1, M2. Also, the actuating cylinders 23, 24 of the plurality of actuating mechanisms include two types of actuating cylinders 23, 24 having mutually different diameters in this embodiment. Specifically, the plurality of actuating mechanisms has an actuating mechanism including an actuating cylinder 23 and a servo motor M1, and an actuating mechanism including an actuating cylinder 24 having a smaller diameter than that of the actuating cylinder 23 and a servo motor M2.

The operation of the pistons 23p, 24p of the respective actuating cylinders 23, 24 is controlled by servo control of the corresponding servo motors M1, M2. In the respective actuating cylinders 23, 24, the respective pistons 23p, 24p are moved to a desired position by servo control (position control), so that the amount of hydraulic oil to be supplied to the injection cylinder 16 is accurately controlled.

Next, the operating pattern (injection pattern) of the injection cylinder 16 at the time of injection will be explained in accordance with FIG. 2.

The injection cylinder 16 operates in three steps: a low-speed step, a high-speed step and a pressure-increasing step. The low-speed step is an initial-stage step of injection, involving operating the piston 16p of the injection cylinder 16 at a low speed when the metal material supplied into the injection sleeve 14 is forced out into the cavity 13. The high-speed step is a step to be carried out subsequent to the low-speed step, involving operating the piston 16p of the injection cylinder 16 at a higher speed than in the low-speed step. The pressure-increasing step is a final-stage step of injection to be carried out subsequent to the high-speed step, involving increasing the pressure to be imparted to the metal material within the cavity 13 by the force in a forward movement direction of the piston 16p of the injection cylinder 16.

Figure 2:
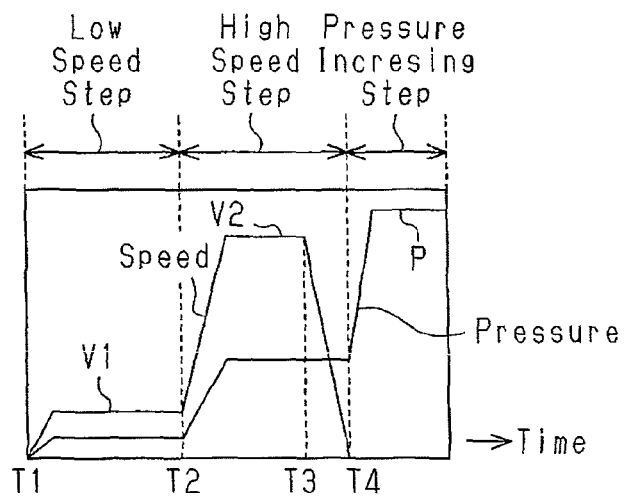
FIG. 2 is a schematic view showing the operating pattern of an injection cylinder of the injection apparatuses shown in FIG. 1.

Different speeds and pressures are required of the injection cylinder 16 in each of the steps as shown in FIG. 2. Specifically, the piston 16p of the injection cylinder 16 must be operated at a higher speed in the high-speed step but, on the other hand, does not require a speed in the pressure-increasing step. Also, the piston 16p of the injection cylinder 16 must be operated to impart a higher pressure in the pressure-increasing step. In the low-speed step and the high-speed step, however, it does not have to be operated to impart a pressure as high as that in the pressure-increasing step.

Figure 3:
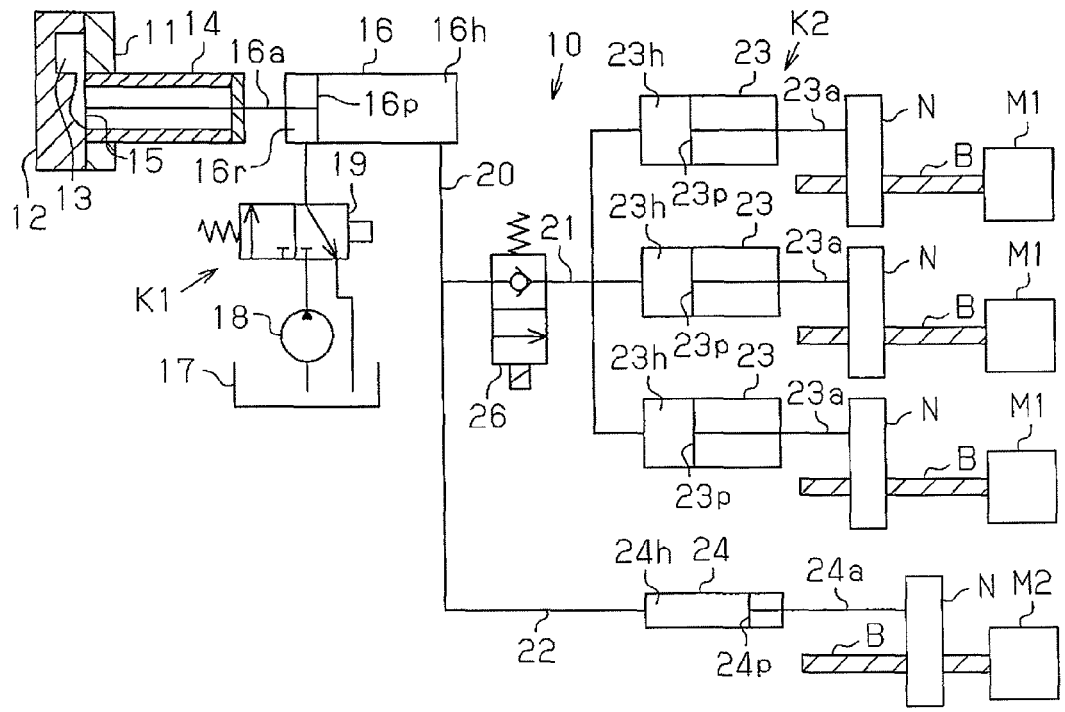
FIG. 3 is a schematic view showing the operating state of the injection apparatus in a high-speed step.
Figure 4:
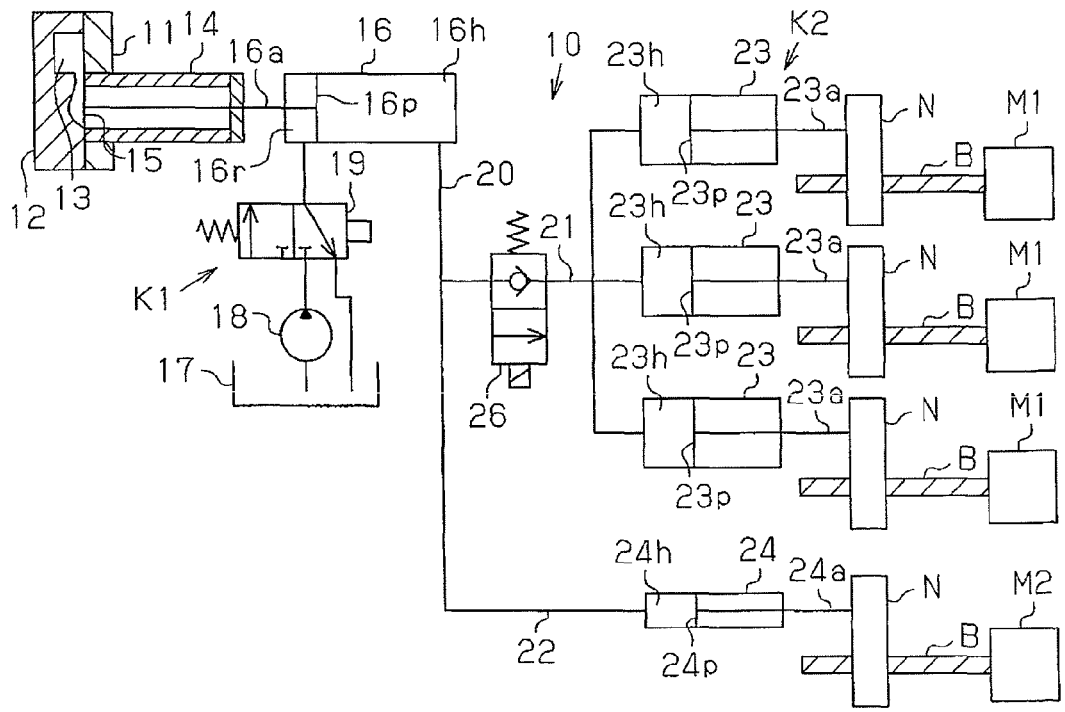
FIG. 4 is a schematic view showing the operating state of the injection apparatus in a pressure-increasing step.

Hereinafter, the action of the die cast machine 10 of this embodiment will be explained in accordance with FIGS. 3 and 4.

The die cast machine 10 operates the respective pistons 23p, 24p of the respective actuating cylinders 23, 24 such that the piston 16p of the injection cylinder 16 operates in accordance with the operating pattern shown in FIG. 2.

Firstly, the low-speed step will be explained.

Before the beginning of the low-speed step, the piston 16p of the injection cylinder 16 and the respective pistons 23p, 24p of the respective actuating cylinders 23, 24 are positioned at predetermined initial positions as shown in FIG. 1. In the meantime, the respective pistons 16p, 23p, 24p positioned at the initial positions do not impart injection pressure to the metal material to be supplied within the injection sleeve 14 (timing T1 in FIG. 2). Also, the electromagnetic switch valve 19 of the supplying/discharging mechanism K1 is switched to return the hydraulic oil in the rod side chamber 16r of the injection cylinder 16 back to the oil tank 17 at the beginning of molding.

After completion of preparation for molding such as mold clamping of the fix mold 11 and the movable mold 12 and supply of the metal material to the injection sleeve 14, the low-speed step is started. In the low-speed step, the servo motors M1 of the respective actuating cylinders 23 are controlled such that the piston 16p of the injection cylinder 16 moves at an injection speed V1 as shown in FIG. 2. This rotates the respective servo motors M1 at a speed corresponding to the injection speed V1 for the injection cylinder 16 during the low-speed step. The nut N screwed with the ball screw B moves forward (operation toward the left direction in FIG. 1) upon rotation of the corresponding servo motor M1, so that the driving force is imparted via the nut N, and therefore the pistons 23p of the respective actuating cylinders 23 move forward. The forward movement of the nut N and the piston 23p is an operation in a direction of forcing out the hydraulic oil within the head side chambers 23h of the respective actuating cylinders 23 to the main line 20, namely, supplying the hydraulic oil to the head side chamber 16h of the injection cylinder 16.

Upon operation of the pistons 23p of the respective actuating cylinders 23, the hydraulic oil within the corresponding head side chambers 23h is supplied, through the sub line 21, the electromagnetic switching valve 26 and the main line 20 in this order, to the head side chamber 16h of the injection cylinder 16. Due to this, the piston 16p of the injection cylinder 16 undergoes the pressure from the hydraulic oil supplied to the head side chamber 16h and moves forward. Also, the injection plunger 15 coupled to the piston rod 16a of the injection cylinder 16 similarly moves forward upon forward movement of the piston 16p. This forward movement of the injection plunger 15 results in the injection of the metal material within the injection sleeve 14 into the cavity 13. The forward movement of the injection plunger 15 and the piston 16p is an operation in a direction of forcing out the metal material within the injection sleeve 14 into the cavity 13. In the meantime, the direction in which the piston 16p moves forward is also a direction of returning the hydraulic oil within the rod side chamber 16r to the oil tank 17 of the supplying/discharging mechanism K1.

The piston 16p of the injection cylinder 16 moves forward at the injection speed V1 shown in FIG. 2 upon supply of hydraulic oil from the actuating cylinder 23. In this embodiment, the amount of the hydraulic oil to be supplied to the head side chamber 16h of the injection cylinder 16 is accurately controlled due to the positions of the pistons 23p of the respective actuating cylinders 23 being feedback-controlled by the servo mechanisms. This enables accurate forward movement of the piston 16p of the injection cylinder 16 at the injection speed V1.

Once the pistons 23p of the respective actuating cylinders 23 reach positions for starting the high-speed step (timing T2 as shown in FIG. 2), the low-speed step shifts to the high-speed step.

Next, the high-speed step will be explained in accordance with FIG. 3.

In the high-speed step, the servo motors M1 of the respective actuating cylinders 23 are controlled such that the piston 16p of the injection cylinder 16 moves at an injection speed V2 as shown in FIG. 2. This leads to the rotation of the respective servo motors M1 at a speed corresponding to the injection speed V2 for the injection cylinder 16 in the high-speed step.

Since the pistons 23p of the respective actuating cylinders 23 operate at a higher speed during the high-speed step than the speed during the low-speed step, the amount of the hydraulic oil per unit time which is to be forced out from the respective head side chambers 23h increases. As a result, the amount of the hydraulic oil per unit time which flows into the head side chamber 16h of the injection cylinder 16 also increases, and thus the speed when piston 16p moves forward is faster than the speed during the low-speed step. Due to this, the piston 16p of the injection cylinder 16 moves forward at the injection speed V2 shown in FIG. 2.

During the high-speed step, the injection plunger 15 also moves forward at the injection speed V2 in conjunction with the forward movement of the piston 16p of the injection cylinder 16. This forward movement of the injection plunger 15 leads to an increase in amount of the metal material within the injection sleeve 14 to be injected into the cavity 13 as compared with the amount during the low-speed step.

In this embodiment, the amount of the hydraulic oil to be supplied to the head side chamber 16h of the injection cylinder 16 is accurately controlled due to the feedback-controlled positions of the pistons 23p of the respective actuating cylinders 23. As a result, the piston 16p of the injection cylinder 16 can accurately move forward at the injection speed V2.

Also, in this embodiment, three actuating mechanisms (combinations of the actuating cylinders 23 and the servo motors M1) supply hydraulic oil to the injection cylinder 16 to impart a driving force. Therefore, when the piston 16p of the injection cylinder 16 is operated at the injection speed V2 necessary during the high-speed step, the performance required of one servo motor M1 can be lowered. Specifically, when the injection speed V2 is realized by use of a single actuating mechanism, it is necessary to force out hydraulic oil to the head side chamber 16h of the injection cylinder 16 in an amount three times larger per unit time than the amount of oil forced out when the injection speed V2 is realized by use of three actuating mechanisms as in this embodiment. That is, in the case of a single actuating mechanism, it is necessary to control the piston 23p of the actuating cylinder 23 which constitutes the actuating mechanism at a speed three times faster, and the high-speed performance of the servo motor M1 and the ball screw B would be required. Thus, the increase in speed of the injection cylinder 16 is made possible without requiring high performance of the servo motor M1 or ball screw B if a plurality of actuating mechanisms is arranged in parallel to operate the pistons 23p of the plurality of actuating cylinders 23 at the same time, as in this embodiment.

In the high-speed step, as the positions of the pistons 23p of the respective actuating cylinders 23 get close to the deceleration positions in the high-speed step (timing T3 in FIG. 2), the servo motors M1 are decelerated. This leads to the deceleration of the pistons 23p of the respective actuating cylinders 23 as well. Thereafter, once the pistons 23p of the respective actuating cylinders 23 reach the stop positions in the high-speed step (timing T4 in FIG. 2), the high-speed step terminates and shifts to the pressure-increasing step.

Next, the pressure-increasing step will be explained in accordance with FIG. 4.

In the pressure-increasing step, the servo motor M2 of the actuating cylinder 24 is controlled such that the pressure to be imparted by the piston 16p of the injection cylinder 16 becomes an injection pressure P as shown in FIG. 2. Due to the forward movement of the nut N screwed with the ball screw B by the rotation of the servo motor M2, driving force is imparted via the nut N to the piston 24p of the actuating cylinder 24 so that the piston 24p of the actuating cylinder 24 moves forward.

Upon operation of the piston 24p of the actuating cylinder 24, the hydraulic oil within the head side chamber 24h is supplied to the head side chamber 16h of the injection cylinder 16 through the sub line 22 and the main line 20. The diameter of this actuating cylinder 24 is set to be smaller than those of the respective actuating cylinders 23, and thus the actuating cylinder 24 generates high pressure as compared with the respective actuating cylinders 23, even when driven with a motor having the same output. In this embodiment, when hydraulic oil is supplied to the head side chamber 16h of the injection cylinder 16 from the actuating cylinder 24, the pressure within the head side chamber 16h increases, based on the Pascal's law, and the pressure that the piston 16p of the injection cylinder 16 receives from the head side chamber 16h also increases. As a result, the force of the injection plunger 15 pressurizing the metal material within the cavity 13 increases.

Also, during the pressure-increasing step, the hydraulic oil forced out from the actuating cylinder 24 flows into the head side chamber 16h of the injection cylinder 16 through the main line 20 without flowing into the sub line 21, i.e., the head side chambers 23h of the respective actuating cylinders 23 because the electromagnetic switching valve 26 arranged in the sub line 21 functions as a check valve. Due to this, the piston 23p of the actuating cylinder 23 does not receive any force caused by the high-pressure hydraulic oil forced out from the actuating cylinder 24 having a smaller diameter, and retains the current position without moving backward. Namely, due to the backflow preventing action of the electromagnetic switching valve 26, the pressure that the piston 16p of the injection cylinder 16 imparts via the injection plunger 15 can be used as the injection pressure P.

Subsequently, after solidification of the metal material within the cavity 13, the piston 16*p* of the injection cylinder 16 is moved backward. At this time, the pump 18 is operated, and the electromagnetic switch valve 19 is switched into the state where the hydraulic oil pumped up by the pump 18 can be supplied to the rod side chamber 16*r* of the injection cylinder 16. Also, the electromagnetic switching valve 26 is switched into a state where it allow for the flow of the hydraulic oil within the head side chamber 16*h* of the injection cylinder 16 from the main line 20 to the sub line 21, and the respective servo motors M1, M2 are rotated backward to move the pistons 23*p*, 24*p* of the respective actuating cylinders 23, 24 backward. Due to this, the backward movement of the piston 16*p* of the injection cylinder 16 also causes the backward movement of the injection plunger 15, and the hydraulic oil within the head side chamber 16*h* is returned back to the head side chambers 23*h*, 24*h* of the respective actuating cylinders 23, 24. Therefore, the fix mold 11 and the movable mold 12 are opened, whereby molded articles are taken out of the mold.

Thus, according to this embodiment, the following advantages can be obtained.

(1) A plurality of actuating mechanisms each including one actuating cylinder 23, 24 and one servo motor M1, M2 are connected to the injection cylinder 16. Due to this, the operating force can be imparted to the injection cylinder 16 by supply of hydraulic oil from the plurality of actuating cylinders 23, 24. Specifically, it is possible to increase the operating force which can be imparted to the injection cylinder 16 depending on the number of the actuating cylinders which are operated at the same time. Thus, the injection speed and injection pressure which cannot be realized by one motor can be realized by connecting a plurality of motors.

(2) The servo motors M1, M2 are used as driving source for the pistons 23*p*, 24*p* of the respective actuating cylinders 23, 24, and servo control is carried out as the control of the servo motors M1, M2. Therefore, the management of the flow rate of the hydraulic oil to be supplied from the respective actuating cylinders 23, 24 to the injection cylinder 16 can be surely carried out. Thus, the injection cylinder 16 can be suitably operated. Also, the entire operating pattern area of the injection cylinder 16 can be covered by servo control, and thus the injection cylinder 16 can be finely controlled as compared with hydraulic control.

(3) The actuating cylinders 23, 24 of the plurality of actuating mechanisms include an actuating cylinder 23 and an actuating cylinder 24 having different diameters. Due to this, the actuating cylinders 23, 24 having different diameters can be operated to satisfy the injection speed and injection pressure necessary in injection molding, thereby suitably operating the injection cylinder 16.

(4) The electromagnetic switching valve 26 which functions as a check valve is arranged in the sub line 21 to which the actuating cylinder 23 is connected. This can prevent hydraulic oil from flowing into the actuating cylinder 23 having a larger diameter when the actuating cylinder 24 having a smaller diameter is operated. Therefore, the hydraulic oil from the actuating cylinder 24 having a smaller diameter can be surely supplied to the injection cylinder 16, and the injection cylinder 16 can be suitably operated.

(5) The injection cylinder 16 operates by supplying hydraulic oil from the actuating cylinders 23, 24. Due to this, it is possible to operate the injection cylinder 16 to absorb, for example, variations in operation due to the servo motors and to satisfy the desired injection speed and injection pressure, as compared with the case where the operating force to the injection cylinder 16 is imparted by mechanical coupling of a plurality of servo motors.

(6) A plurality of actuating mechanisms is connected to the injection cylinder 16 in order to operate the injection cylinder 16. Therefore, it is possible to easily set injection conditions such as the injection speed and injection pressure necessary for injection molding in accordance with the combination of actuating mechanisms. Namely, the degree of freedom of design can be widened.

(7) According to the arrangement of the actuating mechanism in this embodiment, the performance required of the servo motors M1, M2 can be lowered. Therefore, it is unnecessary to specially provide a high-performance servo motor in order to satisfy injection conditions such as the injection speed and injection pressure necessary for injection molding. Specifically, commercially-available inexpensive parts (servo motors) having high manufacturing economics of scale can be used in combination to satisfy the injection conditions, so that the cost increase can be suppressed.

(8) Also, as for the actuating cylinders 23, 24, it is unnecessary to specially modify commercially-available actuating cylinders. Thus, commercially-available parts having high manufacturing economics of scale can be used, as is the case with the servo motors M1, M2, so that the cost increase can be suppressed.

In the meantime, the above embodiment may be changed as follows.

Figure 5:
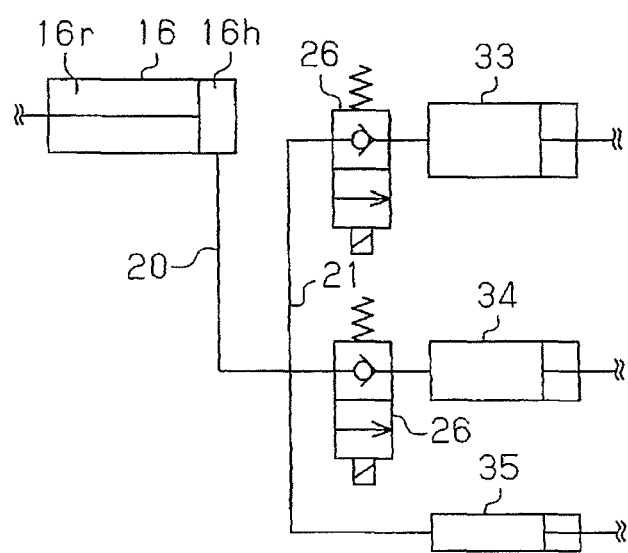
FIG. 5 is a schematic view showing an injection apparatus according to another example of the present invention.

In the embodiment, all the diameters of the actuating cylinders 33, 34, 35 to be connected to the injection cylinder 16 may be different as shown in FIG. 5. When hydraulic oil is supplied to the injection cylinder 16, the actuating cylinders 33 to 35 may be appropriately selected and operated in order to obtain the injection speed and injection pressure necessary in the respective steps. As shown in FIG. 5, when the diameters of the actuating cylinders 33 to 35 are set, an electromagnetic switching valve 26 (check valve) similar to that employed in the embodiment is arranged in the sub line 21 so that the hydraulic oil when the actuating cylinder 35 having the smallest diameter would not flow backward to the other actuating cylinders 33, 34 having a larger diameter. In the meantime, FIG. 5 shows the state where the respective actuating cylinders 33 to 35 are connected to the sub line 21 branched from the main line 20 to be connected to the head side chamber 16*h* of the injection cylinder 16. Specifically, in FIG. 5, the injection plunger 15 and actuating mechanisms (servo motor, ball screw and nut) shown in FIG. 1 to explain the embodiment are omitted.

In the embodiment, the number of actuating mechanisms to be connected to the injection cylinder 16 may be two or four or more. Specifically, according to the technical concept explained for the embodiment, the increase in number of actuating mechanisms ensures high speed and high pressure of the injection cylinder 16 without requiring high performance from the servo motors. That is, according to the technical concept explained for the embodiment, the arrangement (specifications of the actuating cylinders) and number of actuating mechanisms for satisfying the injection speed and injection pressure necessary for injection molding can be changed to any combination thereof.

In the embodiment, the drive parts of the pistons 23*p*, 24*p* of the respective actuating cylinders 23, 24 may be linear motors.

In the embodiment, when the piston 16*p* of the injection cylinder 16 is moved backward, the backward movement of the piston 16*p* may be carried out not by supplying the hydraulic oil from the supplying/discharging mechanism K1, but by the backward movement of the pistons 23p, 24p by the control of the respective servo motors M1, M2. Specifically, due to the backward movement of the respective pistons 23p, 24p, the hydraulic oil within the head side chamber 16h of the injection cylinder 16 may be received by the head side chambers 23h, 24h of the respective actuating cylinders 23, 24.

In the embodiment, any of the three actuating cylinders 23 may be operated to realize the injection speed V1 in the low-speed step, and any of all the actuating cylinders 23 may be operated to realize the injection speed V2 in the high-speed step. Even in such an operation form, the injection cylinder 16 is controlled in speed depending on the amount of hydraulic oil to be supplied to the head side chamber 16h, and thus the injection speed can be increased with the increasing amount of hydraulic oil to be supplied. In the meantime, in this operation form, the servo motor may be controlled at a constant speed in the low-speed and high-speed steps, and may be controlled at a variable speed to be increased during the high-speed step from the low-speed step.

In the embodiment, on the assumption that rapid load is added to the servo motors M1 of the respective actuating cylinders 23 when the actuating cylinder 24 is operated, an accumulator for impact absorption may be arranged in the sub line 21 between the electromagnetic switching valve 26 and the respective actuating cylinders 23.

In the embodiment, mechanisms for imparting such a pressure as to cancel the pressure of the head side chambers 23h, 24h may be connected to the rod side chambers of the respective actuating cylinders 23, 24. This arrangement can generate thrust force necessary for a smaller servo motor and can also suppress the cost increase.

In the embodiment, the actuating cylinder 24 may be operated before the respective actuating cylinders 23 start to decelerate during the high-speed step. Due to this arrangement, the electromagnetic switching valve 26 functions as a check valve, thereby preventing the hydraulic oil from the actuating cylinder 24 from flowing into the respective actuating cylinders 23, while only the hydraulic oil from the actuating cylinder 24 flows into the injection cylinder 16, resulting in rapid deceleration of the injection cylinder 16.

The embodiment may be embodied into an injection apparatus for injecting a resin material into a cavity 13 to produce a resin molded article.

In the embodiment, mechanisms which refill the head side chambers 23h, 24h of the respective actuating cylinders 23, 24 with hydraulic oil (pump which pumps up hydraulic oil from the tank) may be connected.

The invention claimed is:

1. An injection apparatus which injects a molding material into a mold by operating an injection cylinder and fills the mold with the molding material, wherein the injection apparatus comprises:
    a plurality of actuating mechanisms connected to the injection cylinder, wherein each of the actuating mechanisms includes:
        an actuating cylinder which supplies an incompressible fluid to the injection cylinder,
        a servo motor which drives a piston of the actuating cylinder, and
        a servo motor controller configured to control an amount of the incompressible fluid supplied to the injection cylinder from the actuating cylinder through a position control of the piston of the actuating cylinder by the servo motor in accordance with an operating pattern when the injection cylinder is operated to inject,
    wherein the actuating cylinders of the plurality of actuating mechanisms include an actuating cylinder having a larger diameter and an actuating cylinder having a smaller diameter,
    the injection apparatus further comprising a check valve that prevents the flow of a fluid from the actuating cylinder having the smaller diameter to the actuating cylinder having the diameter arranged in a sub line to which the actuating cylinder having the larger diameter is connected.

2. The injection apparatus according to claim 1, wherein the servo motor is a servo-controlled electric motor.

3. The injection apparatus according to claim 1, wherein the molding material includes a metal material.

4. The injection apparatus according to claim 1, wherein the operation of the injection cylinder is carried out in a low-speed step, a high-speed step and a pressure-increasing step in this order, wherein the actuating cylinder having the larger diameter operates in the low-speed step and the high-speed step, and wherein the actuating cylinder having the smaller diameter operates in the pressure-increasing step.

5. An injection apparatus which injects a molding material into a mold by operating an injection cylinder and fills the mold with the molding material, wherein
    the injection apparatus comprises:
        a plurality of actuating mechanisms connected to the injection cylinder, wherein each of the actuating mechanisms includes:
            an actuating cylinder which supplies an incompressible fluid to the injection cylinder, and
            a drive part which drives a piston of the actuating cylinder;
        a main line connected to the injection cylinder; and
        a plurality of sub lines branched from the main line, wherein:
            the actuating cylinders of the plurality of actuating mechanisms are respectively connected to the plurality of sub lines,
            the actuating cylinders of the plurality of actuating mechanisms have two or more cylinder diameters including an actuating cylinder having a larger diameter and an actuating cylinder having a smaller diameter, and
            a check valve which prevents the flow of a fluid from the actuating cylinder having a smaller diameter to the actuating cylinder having a larger diameter is arranged in the sub line to which the actuating cylinder having a larger diameter is connected.

6. The injection apparatus according to claim 5, wherein the operation of the injection cylinder is carried out in a low-speed step, a high-speed step and a pressure-increasing step in this order, wherein the actuating cylinder having a larger diameter operates in the low-speed step and the high-speed step, and wherein the actuating cylinder having a smaller diameter operates in the pressure-increasing step.

7. The injection apparatus according to claim 5, wherein the servo motor is a servo-controlled electric motor.

8. The injection apparatus according to claim 5, wherein the molding material includes a metal material.

* * * * *